United States Patent
Park et al.

(10) Patent No.: US 7,218,928 B2
(45) Date of Patent: May 15, 2007

(54) NETWORK ANALYZING METHOD AND APPARATUS FOR OPTIMAL PERFORMANCE OF NETWORK, AND A RECORDING MEDIUM HAVING PROGRAMS TO CONDUCT SAID METHOD

(75) Inventors: Sang Jin Park, Sungnam-si (KR); Yong Hee Lee, Sungnam-si (KR); Chi Young Ahn, Sungnam-si (KR); Se Jung Lee, Sungnam-si (KR); Bok Cheol Shin, Sungnam-si (KR); Byeong Cheol Ahn, Sungnam-si (KR); Jong Tae Ihm, Sungnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 10/496,782

(22) PCT Filed: Dec. 6, 2002

(86) PCT No.: PCT/KR02/02302

§ 371 (c)(1),
(2), (4) Date: Nov. 12, 2004

(87) PCT Pub. No.: WO03/055251

PCT Pub. Date: Jul. 3, 2003

(65) Prior Publication Data

US 2005/0064820 A1    Mar. 24, 2005

(30) Foreign Application Priority Data

Dec. 7, 2001  (KR) .................. 10-2001-0077232

(51) Int. Cl.
*H04Q 7/20* (2006.01)
(52) U.S. Cl. .................. 455/423; 455/422.1; 455/424; 455/425
(58) Field of Classification Search ............. 455/422.1, 455/423, 424, 425, 560
See application file for complete search history.

(56) References Cited

U.S. PATENT DOCUMENTS 6,141,565 A * 10/2000 Feuerstein et al. .......... 455/560
6,578,085 B1 * 6/2003 Khalil et al. ................ 709/241

* cited by examiner

*Primary Examiner*—Matthew Anderson
*Assistant Examiner*—Tuan Pham
(74) *Attorney, Agent, or Firm*—Lowe Hauptman & Berner, LLP

(57) ABSTRACT

The present invention relates to method and apparatus of analyzing a wired/wireless communication network to optimize performance of the network. In the present invention, data are continuously gathered from all elements constituting a wired/wireless communication network and are analyzed to find an element of which performance and/or efficiency deteriorates. If found, an optimal plan to resolve low performance and/or efficiency is chosen through the data analysis and is then provided in real time. The present invention also relates to a recording medium storing computer programs to conduct said procedures.

13 Claims, 3 Drawing Sheets

NETWORK ANALYZING METHOD AND APPARATUS FOR OPTIMAL PERFORMANCE OF NETWORK, AND A RECORDING MEDIUM HAVING PROGRAMS TO CONDUCT SAID METHOD

This is a nationalization of PCT/KR02/02302 filed Dec. 6, 2002 and published in English.

1. Technical Field

The present invention relates to a network analysis apparatus and method for providing optimal network performance and a computer-readable recording medium having a program for implementing the method, and more particularly to a network analysis apparatus and method which monitor status, constitution, performance, failure (also called interference), radio frequency (RF), and repeater factor information of a wired/wireless communication network, determine whether abnormal performance information is transmitted over the network on the basis of the monitored information, find a reason for the abnormal performance information of the network, verify a plurality of solutions for overcoming this network problem, and thereby provides in real time the network with optimal solutions for solving the problem, and a computer-readable recording media having a program for executing the method.

2. Background Art

In recent times, there have been proposed a variety of communication networks, for example, a mobile communication network, a personal communication network, an RF data network, a trunked radio network, and an IMT (International Mobile Telecommunication)-2000 network serving as the next generation mobile communication network, etc. However, their QoS (Quality of Service) varies with the motion of a mobile communication terminal and loads in a BTS (Base Transceiver Station). For example, in the case where many subscribers are present in a service area controlled by a specific BTS, interference between channels unavoidably occurs, resulting in QoS deterioration and a shorter service radius of the BTS. Therefore, in this case, a mobile communication terminal communicating with a called party at a boundary between the specific BTS and another BTS is handed off to a neighboring BTS, or disconnected from the called party. This call disconnection is also called a call drop. Such a call drop frequently occurs in a call connection state between calling and called terminals, resulting in inconvenience to the subscribers.

Conventionally, in the case where a communication problem such as a call drop occurs due to QoS deterioration in a prescribed service area, a service engineers must directly go to the prescribed area and measure a reception power level of the mobile communication terminal using their network measurement tools, or the network measurement tools may generate test calls in such a way that the service providers can recognize the reason for the call drop.

In this way, according to a conventional network system, if any problem such as a network failure occurs in a prescribed area, then the service engineer directly goes to the prescribed area, manually measures network characteristics at the area, and finally solves the problem by analyzing the measured results, resulting in undesired waste of time even though the problem is simple to solve. In addition, information measurements are taken by the network measurement device at only a few network measurement points within the prescribed area, and then adapted to solve the above problem, thus a limited amount of information is used while analyzing network troubles. Also, the conventional network system consumes excessive costs for its operation and maintenance because it must use the network measurement device and additional manpower for operating the network measurement device.

Further, in order to overcome the above disadvantage of such a wireless network, the conventional network system must recognize status, performance, and parameter information of an RF system having fields and an antenna, a BTS, a BSC (Base Station Controller), and a core network (e.g., a MSC (Mobile Switching Center), and a HLR (Home Location Register)). Therefore, it is difficult for a network engineer to construct an optimal network and find the reason for performance deterioration in the conventional network system.

3. DISCLOSURE OF INVENTION

Therefore, the present invention has been made in view of the above problems, and it is an object of the present invention to provide a network analysis apparatus for collecting network parameters to optimize network performance, monitoring network performance indices, statistically analyzing the collected network parameters and the monitored performance indices, and thus indicating in real time the reason for network performance deterioration.

It is another object of the present invention to provide a network analysis method for collecting network parameters to optimize network performance, monitoring network performance indices, statistically analyzing the collected network parameters and the monitored performance indices, and thus indicating in real time the reason for network performance deterioration.

It is yet another object of the present invention to provide a computer-readable recording medium storing a program for executing the network analysis method for providing optimal network performance, which collects network parameters, monitors network performance indices, statistically analyzes the collected network parameters and the monitored performance indices, and thus indicates in real time the reason for network performance deterioration.

In accordance with one aspect of the present invention, the above and other objects can be accomplished by the provision of an analysis apparatus for optimizing network performance to indicate in real time a reason for deterioration of the network performance, including: a network information collector for collecting information associated with the network; a first analyzer for analyzing a cause of a call drop and a cell optimization function upon receiving the collection information from the network information collector; a second analyzer for analyzing the reason for the network performance deterioration by performing a data correlation analysis, a data trend analysis, and a data regression analysis at predetermined intervals upon receiving the collection information from the network information collector, and obtaining trend analysis data using data created for a busy hour; a third analyzer for analyzing KPI (Key Performance Index) data in association with performance and efficiency data of a BTS (Base Transceiver Station) and a sector at predetermined intervals, upon receiving the collection information from the network information collector; a main server for receiving the collection information from the network information collector, providing the received collection data to the first analyzer, the second analyzer, and the third analyzer, and receiving data analyzed by the first analyzer, the second analyzer, and the third analyzer; a storage medium for receiving data from the main server, and storing the received data; and a Web server for receiving data from the main server, and providing an operator with the received data.

In accordance with another aspect of the present invention, there is provided an analysis method for optimizing network performance to indicate in real time a reason for deterioration of the network performance, including the steps of: a) automatically and successively collecting network data associated with network components containing all BTSs, sectors, HAs (Home Agents), and FAs (Foreign Agents) of the network, using network resources; b) automatically selecting an element of which performance and efficiency need to be improved, on the basis of the collected network data; c) collecting data associated with the selected element; d) analyzing the collected data of the step (c) to optimize the network performance; and e) recognizing network status information before/after improving the network performance and a network efficiency by measuring field condition of the network, and confirming and verifying improvement effects of the network performance and the network efficiency.

In accordance with yet another aspect of the present invention, there is provided a computer-readable recording medium storing a program for executing a network analysis method, in an analysis apparatus having a microprocessor, for optimizing network performance in order to indicate in real time a reason for deterioration of the network performance, including the steps of: a) automatically and successively collecting network data associated with network components containing all BTSs, sectors, HAs (Home Agents), and FAs (Foreign Agents) of the network, using network resources; b) automatically selecting a target element of which performance and efficiency need to be improved, on the basis of the collected network data; c) collecting data associated with the selected target element; and d) analyzing the collected data of the step (c) to optimize the network performance.

The present invention receives constitution, state, failure, and RF data information from a network information provider, analyzes and monitors the received data information, and provides in real time a user or operator with the resultant data, such that the user or operator can have synthetic base data used for optimizing network performance.

4. BRIEF DESCRIPTION OF DRAWINGS

The above and other objects, features and other advantages of the present invention will be more clearly understood from the following detailed description taken in conjunction with the accompanying drawings, in which.

5. MODES FOR CARRYING OUT THE INVENTION

Figure 1:
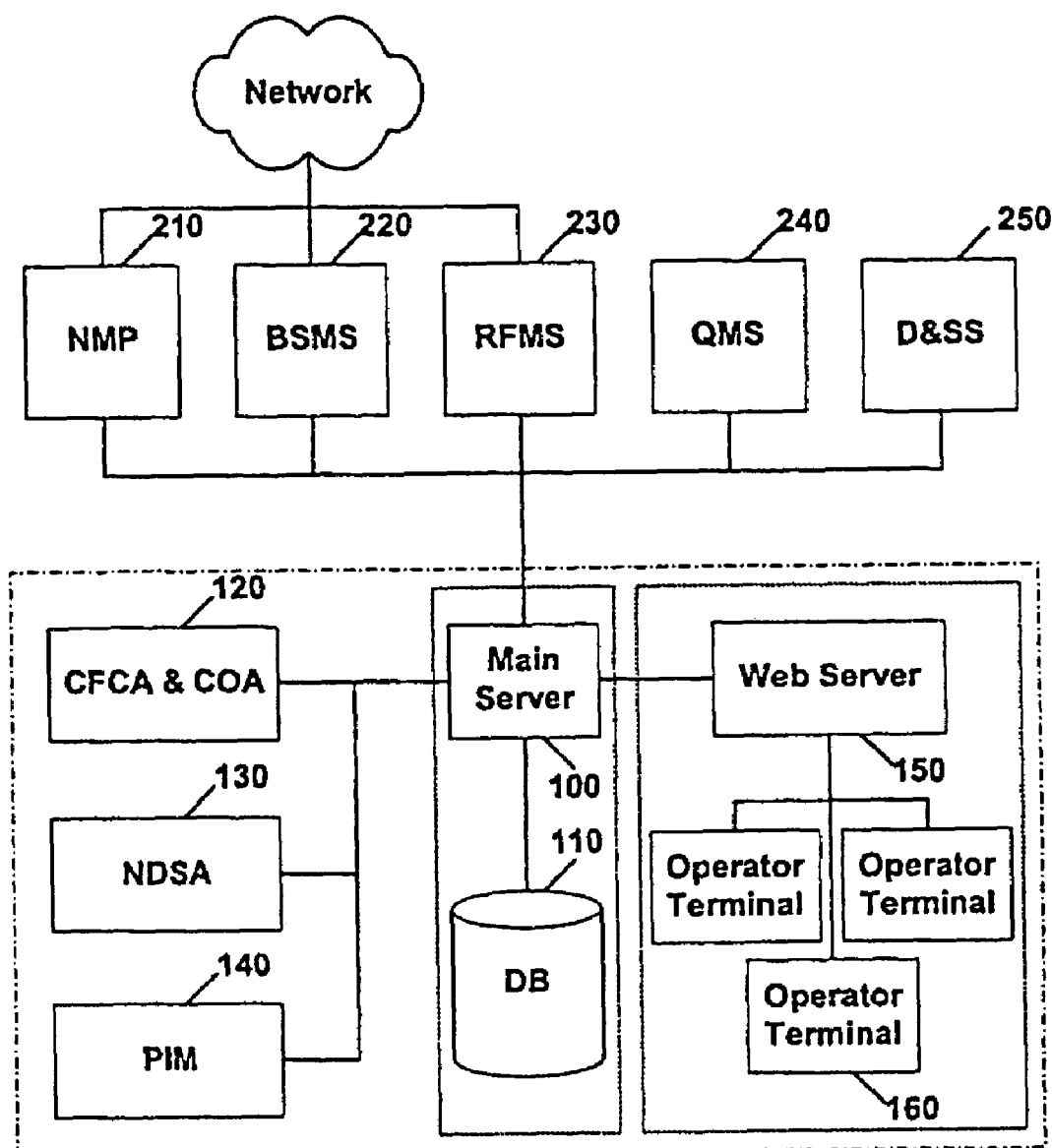
FIG. 1 is a view illustrating a block diagram of a network analyzer for providing optimal network performance in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

In the present invention, a wired network and a wireless network will be referred to hereinafter only as a network.

FIG. 1 is a view illustrating a block diagram of a network analyzer for providing optimal network performance in accordance with a preferred embodiment of the present invention.

With reference to FIG. 1, the network analyzer includes a main server 100, a database (DB) 110, a CFCA&COA (Call Failure Cause Analysis and Cell optimization Analysis) module 120, a NDSA (Network Data Statistics Analysis) module 130, a PIM (Performance Index Monitor) module 140, a Web server 150, and a plurality of operator terminals 160.

The network analyzer further includes a NMS (Network Management System) 210, a BSMS (Base Station Management System) 220, a RFMS (RF Monitoring System) 230, a QMS (Quality Management System) 240, and a D&SS (Dynamic & Static Simulator) 250.

The NMS 210 collects and analyzes a plurality of data associated with various information (i.e., performance, failure, constitution, and RF information of a network) received from many mobile communication systems (i.e., a sector, a BTS, a BSC, a MSC, a HA (Home Agent), and a FA (Foreign Agent)) while the network is in operation, determines whether a network failure occurs on the basis of the analyzed data, and transmits prescribed data indicative of the network failure to a main server 100.

The BSMS 220 collects and analyzes a plurality of data associated with various information (i.e., performance, failure, constitution, and RF information of a network) received from the BTS and the BSC (not shown), determines whether a network failure occurs on the basis of the analyzed data, and transmits prescribed data indicative of the network failure to the main server 100.

The RFM 230 measures signal waveforms, channel power, and spurious waves at a BTS RF transmission/reception module (not shown), and transmits the measured result data to the main server 100.

The QMS 240 collects a plurality of data measured for every field (hereinafter referred to as field measurement data), stores the collected data in a database, and transmits databased data to the main server 100. The field measurement data is created when a field engineer goes to a desired field and manually measures the field's quality (also called a field QoS) in the range of the field using either a tester or a special-purpose vehicle with such a tester. The field measurement data is transferred to the QMS 240, and then stored in a database.

The D&SS 250 estimates propagation path, attenuation and an amount of interference of output signals of a specific field such as a BTS on the basis of geographic information and traffic data, visually displays the estimated data, and stores the displayed to data in a given place. The D&SS 250 estimates data such as subscriber's motion variable in time, signal attenuation effect, and power control, visually displays the estimated data, and stores the displayed data in a given place. Therefore, the main server 100 analyzes and utilizes the simulation result data stored in the D&SS 250.

A plurality of parameters collected by the NMS 210, the BSMS 220, the RFM 230, the QMS 240, and the D&SS 250 are transferred to the main server 100 in real time.

The main server 100 receives the parameters from the NMS 210, the BSMS 220, the RFMS 230, the QMS 240, and the D&SS 250, and transmits the received parameters to the DB 110.

The main server 100 transmits the received parameters to the CFCA&COA module 120, the NDSA module 130, and the PIM module 140, receives analyzed data from the CFCA&COA module 120, the NDSA module 130, and the PIM module 140, and then transmits the resultant data to the DB 110.

The DB 110 receives data from the main server 100, and stores the received data.

The Web server 150 provides service environment to enable an operator to visually check in real time the analyzed data through the operator terminal 160.

The operator can visually check in real time the data analyzed by the aforementioned analysis method for providing optimal network performance through the operator terminal 160, diagnose and optimize a network problem according to the analyzed result.

The CFCA&COA module 120 analyzes data received from the main server 100, checks a system and a wireless link on the basis of the analyzed data, and thereby analyzes the reason for a call drop. Further, the CFCA&COA module 120 checks the possibility of handover and the handover overhead, and analyzes a cell optimization function.

In this case, checking the system is established by analyzing a system alarm (ALM) factor, a system fault (FLT) factor, a disconnection call (F3000), and system parameters. Checking the wireless link is established by analyzing RF spurious waves, RF alarms, traffic channels, own cell interference (OCI), and neighboring cell interference information in the forward and reverse directions.

Also, in the case of analyzing the cell optimization information, a Q-factor, a paging response ratio, and a TCE (Traffic Channel Element) usage ratio are analyzed such that the cell optimization information can also be analyzed.

The NDSA module 130 analyzes the reason for network performance deterioration using data correlation analysis information, trend analysis information, and regression analysis information at predetermined intervals (e.g., one hour unit).

The PIM module 140 monitors effective KPI (Key Performance Index) information for every BTS or every sector at predetermined intervals (e.g., 15 minutes or one hour), and monitors effective KPI information such as handover information, Q-factor information, and a paging response ratio for a busy hour (i.e., a peak time).

The KPI also indicates a call connection ratio, a call completion ratio, and a call drop ratio.

Figure 2:
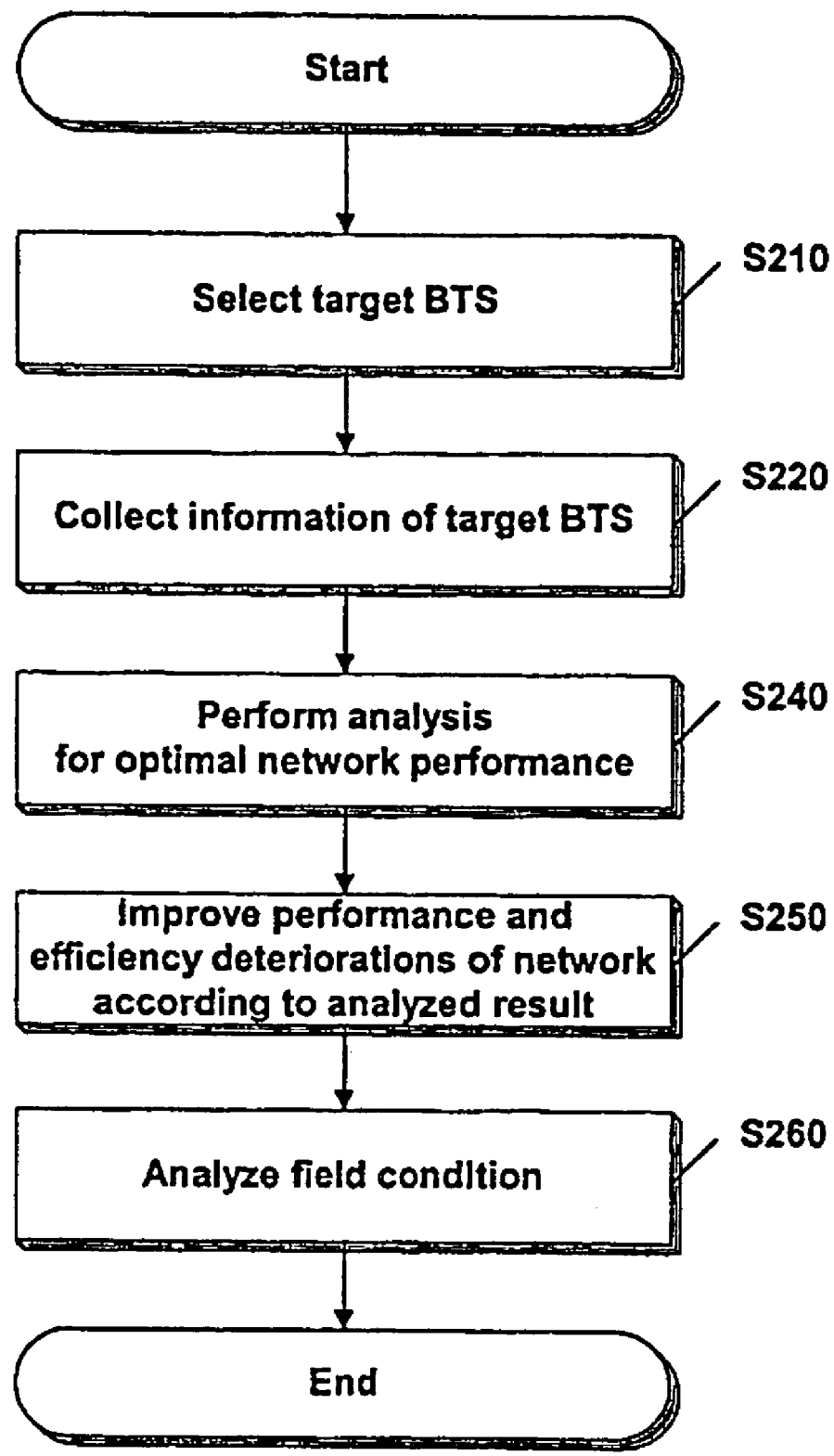
FIG. 2 is a flow chart illustrating a method for collecting parameters to optimize network performance in accordance with a preferred embodiment of the present invention.

FIG. 2 is a flow chart illustrating a method for collecting parameters to optimize network performance in accordance with a preferred embodiment of the present invention. Although the present invention uses a BTS as a network's element to be improved, it is applicable to other elements other than the BTS, for example, a sector, a HA, a FA, a BSC, and a MSC, etc.

Referring to FIG. 2, the analysis method for providing optimal network performance selects a BTS to be improved from among a plurality of BTSs at step 210 on the basis of network data continuously provided from the NMS 210, the BSMS 220, the RF module 230, the QMS 240, and the D&SS 250. The selection of one BTS is based on the number of trials and KPI state information for every BTS. The KPI information indicates an outgoing/incoming call connection ratio, a call completion ratio, and a call drop ratio, etc.

If the BTS is selected at step 210, then information of the selected BTS (also called a target BTS) is collected at step 220. These collected parameters are adapted to analyze optimal network performance, and may be an antenna parameter such as orientation, a tilting angle, the type and height of antenna, a gain and height of a building, cell place parameters, etc. The cell position parameters may be latitude/longitude of installation position, overhead power, gain for every channel, address and system parameters.

Thereafter, the network analysis method for optimizing network performance using the aforesaid collected parameter and measurement data is performed at step S240.

According to the analyzed result data used for the optimal network performance, parameters are controlled at step S250 such that performance and efficiency deteriorations associated with the target BTS can be improved.

Then, if field measurement result data measured by a field engineer is transmitted to the QMS 240 by a field engineer, the measurement data is stored in a database, and the main server 100 adapts the stored data to an analysis procedure, such that status information of a corresponding BTS can be recognized before/after improving the BTS's performance and efficiency. Then, the performance and efficiency improvements are checked and verified to analyze a field condition at step S260.

Figure 3:
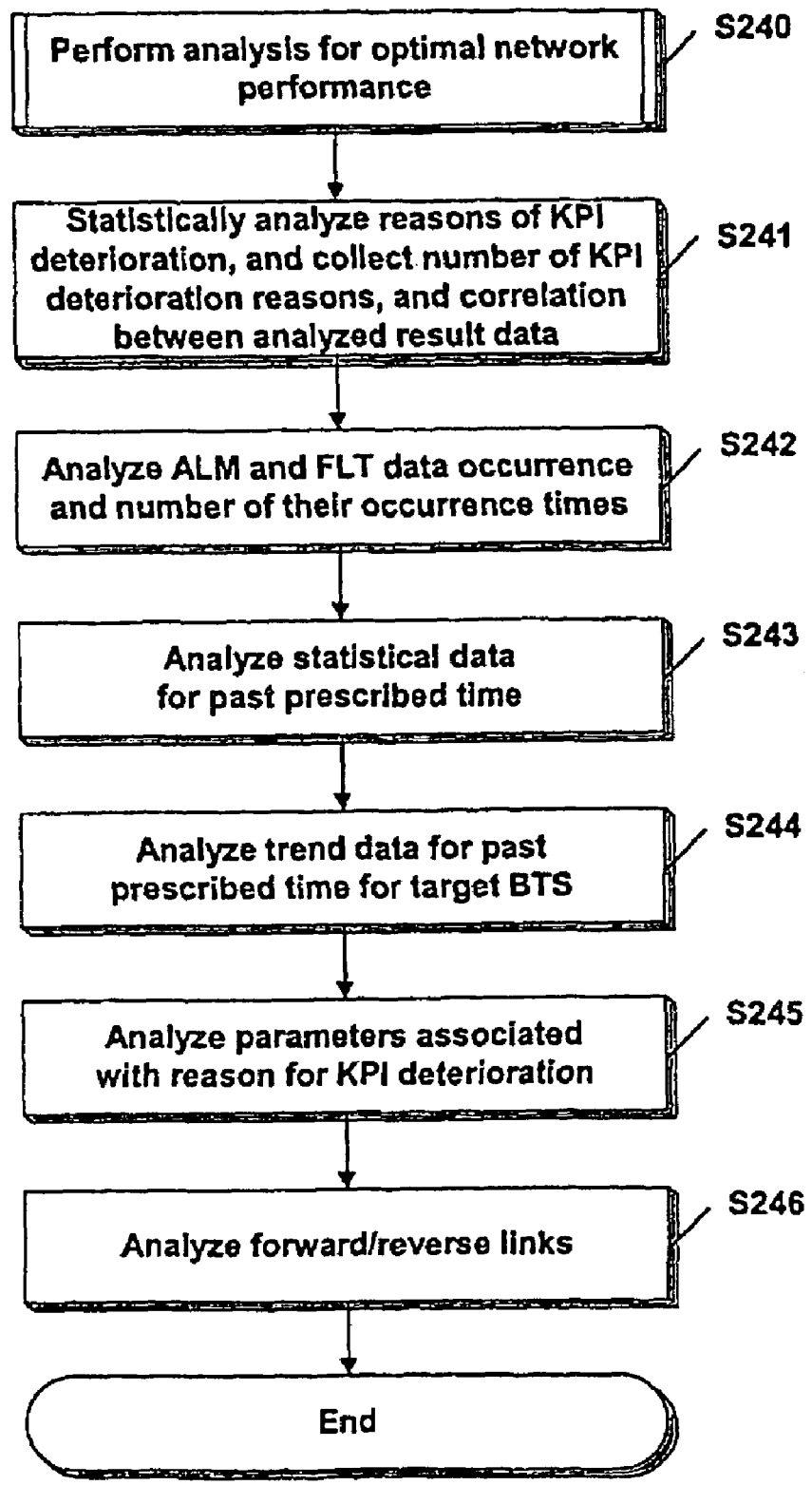
FIG. 3 is a flow chart illustrating a network analysis method for providing optimal network performance in accordance with a preferred embodiment of the present invention.

FIG. 3 is a flow chart illustrating a network analysis method for providing optimal network performance at step s240 shown in FIG. 2 in accordance with a preferred embodiment of the present invention.

Referring to FIG. 3, in the case where a target BTS to be improved is selected, the analysis method according to the present invention statistically analyzes a variety of KPI deterioration reasons, for example, outgoing/incoming call connection ratio, a call completion ratio, and a call drop ratio, such that the number of KPI deterioration reasons and a correlation between analyzed result data are collected at step S241.

The analysis method analyzes information about a place, the number of times, and a time of a system alarm (ALM) or a system fault (FLT) occurrence at step S242.

In accordance with the analysis method of the present invention, the trend data of the KPI deterioration reason is analyzed for a prescribed period of time (e.g., past 20 days) at step S243.

In accordance with the analysis method of the present invention, principal statistical trends in performance data of a target BTS are analyzed for a predetermined period of time (e.g., past 60 days) at step S244. In more detail, trend information for statistical items causing the KPI deterioration, trend information for trial, call connection, call completion, and handover operations, and trend information for processor, link, channel, and RF operations are analyzed at step S244.

The analysis method analyzes parameters associated with the KPI deterioration reasons at step S245. In more detail, a disconnection call (F3000) message for the statistical items causing the KPI deteriorations is analyzed, or erroneous operations are checked on the basis of current condition information of parameter setting values.

In accordance with the analysis method of the present invention, forward/reverse links are analyzed to diagnose forward/reverse problems of a target BTS at step S246. In this case, the analysis of the forward link may include the analysis of a plurality of parameters, for example, overhead output parameter and output parameter for a busy hour (i.e., peak time), an average forward power gain parameter, a digital gain parameter, an RF spurious wave parameter, a RF alarm parameter, a traffic channel parameter, OCI (Own Cell Interference) parameter, and a neighboring cell interference parameter. The analysis of the reverse link may include the analysis of a variety of parameters, for example, thermal noise approximate power parameter of a BTS, a reception power for a busy hour, a cell loading parameter, a frequency reuse efficiency parameter, a maximal prediction capacity parameter, an RF spurious wave parameter, an RF alarm parameter, a traffic channel, OCI (Own Cell Interference) parameter, and a neighboring cell interference parameter.

The analysis method according to the present invention may be stored in a variety of computer-readable recording mediums, for example, a CD-ROM, a ROM, a floppy disk, a HDD (Hard Disk Drive), and a magneto-optical disc drive, etc.

Although the present invention has been described in connection with specific preferred embodiments, those skilled in the art will appreciate that various modifications, additions, and substitutions to the specific elements are possible, without departing from the scope and spirit of the present invention as disclosed in the accompanying claims.

The invention claimed is:

1. An analysis apparatus for optimizing network performance to indicate in real time a reason for deterioration of the network performance, comprising:
    a network information collector for collecting information associated with the network;
    a first analyzer for analyzing a cause of a call drop and a cell optimization function upon receiving the collection information from the network information collector;
    a second analyzer for analyzing the reason for the network performance deterioration by performing a data correlation analysis, a data trend analysis, and a data regression analysis at predetermined intervals upon receiving the collection information from the network information collector, and obtaining trend analysis data using data created for a busy hour being a peak time;
    a third analyzer for analyzing KPI (Key Performance Index) data in association with performance and efficiency data of a BTS (Base Transceiver Station) and a sector at predetermined intervals, upon receiving the collection information from the network information collector;
    a main server for receiving the collection information from the network information collector, providing the received collection data to the first analyzer, the second analyzer, and the third analyzer, and receiving data analyzed by the first analyzer, the second analyzer, and the third analyzer;
    a storage medium for receiving data from the main server, and storing the received data; and
    a Web server for receiving data from the main server, and providing an operator with the received data.

2. The apparatus as set forth in claim 1, wherein the network information collector includes:
    a network manager for collecting/analyzing data received from a network operation device, and transmitting analyzed data to the main server;
    a BTS manager for collecting/analyzing data associated with a BTS contained in the network, and transmitting analyzed data to the main server; and
    an RE monitor for collecting/analyzing data associated with an RF (Radio Frequency) of the network, and transmitting analyzed data to the main server.

3. The apparatus as set forth in claim 2, wherein the network information collector further includes:
    a quality manager for collecting/analyzing data associated with a field of the network, and transmitting analyzed data to the main server; and
    a simulator for collecting/analyzing data associated with propagation attenuation of a signal outputted from the BTS of the network, and transmitting analyzed data to the main server.

4. The apparatus as set forth in claim 1, wherein the data of the network includes data associated with performance, failure, constitution, and radio frequency (RF) of the network.

5. The apparatus as set forth in claim 1, wherein the KPI data includes a call connection ratio, a call completion ratio, and a call drop ratio.

6. An analysis method for optimizing network performance to indicate in real time a reason for deterioration of the network performance, comprising the steps of:
    a) automatically and successively collecting network data associated with network components containing all BTSs (Base Transceiver Stations), sectors, HAs (Home Agents), and FAs (Foreign Agents) of the network, using network resources;
    b) automatically selecting a target element of which performance and efficiency need to be improved, on the basis of the collected network data;
    c) collecting data associated with the selected target element; and
    d) analyzing the collected data of the step (c) to optimize the network performance;
    wherein the step (d) includes the steps of:
        d1) statistically analyzing a reason for the KPI deterioration, collecting the number of KPI deterioration reasons, and a correlation between the analyzed result data;
        d2) analyzing place information, the number of times, and time information of system alarm or fault occurrence;
        d3) analyzing trend data of the KPI deteriorations for a past prescribed period of times;
        d4) analyzing principal statistical trend data in performance data of the target element for a past prescribed period of time;
        d5) analyzing parameters associated with reasons of the KPI deteriorations; and
        d6) analyzing forward/reverse links to diagnose forward/reverse problems of the target element.

7. The method as set forth in claim 6, further comprising the step of:
    e) recognizing network status information before/after improving the network performance and a network efficiency by measuring field condition of the network, and confirming and verifying improvement effects of the network performance and the network efficiency.

8. The method as set forth in claim 6, wherein the KPI data includes a call connection ratio, a call completion ratio, and a call drop ratio.

9. The method as set forth in claim 6, wherein the step (d6) for analyzing the forward/reverse links includes the steps of:
    d6-1) in the case of forward link, analyzing a variety of parameters of the BTS, i.e., overhead output parameter, output parameter obtained for a busy hour, an average forward power gain parameter, and a digital gain parameter; and d6-2) in the case of reverse link, analyzing a variety of parameters of the BTS, i.e., thermal noise approximate power parameter, a reception power for a busy hour, a cell loading parameter, and a frequency reuse efficiency parameter.

10. A computer-readable recording medium storing a program for executing a network analysis method, in an analysis apparatus having a microprocessor, for optimizing network performance in order to indicate in real time a reason for deterioration of the network performance, comprising the steps of:
   a) automatically and successively collecting network data associated with network components containing all BTSs, sectors, HAs (Home Agents), and FAs (Foreign Agents) of the network, using network resources;
   b) automatically selecting a target element of which performance and efficiency need to be improved, on the basis of the collected network data;
   c) collecting data associated with the selected target element; and
   d) analyzing the collected data of the step (c) to optimize the network performance;
   wherein the step (d) includes the steps of:
      d1) statistically analyzing a reason for the KPI deterioration, collecting the number of KPI deterioration reasons, and a correlation between the analyzed result data;
      d2) analyzing place information, the number of times, and time information of system alarm or fault occurrence;
      d3) analyzing trend data of the KPI deteriorations for a past prescribed period of time;
      d4) analyzing principal statistical trend data in performance data of the target element for a past prescribed period of time;
      d5) analyzing parameters associated with reasons of the KPI deteriorations; and
      d6) analyzing forward/reverse links to diagnose forward/reverse problems of the target element.

11. The computer-readable recording medium as set forth in claim 10, further comprising the step of:
   e) recognizing network status information before/after improving the network performance and a network efficiency by measuring field condition of the network, and confirming and verifying improvement effects of the network performance and the network efficiency.

12. The computer-readable recording medium as set forth in claim 10, wherein the KPI data includes a call connection ratio, a call completion ratio, and a call drop ratio.

13. The computer-readable recording medium as set forth in claim 10, wherein the step (d6) for analyzing the forward/reverse links includes the steps of:
   d6-1) in the case of forward link, analyzing a variety of parameters of the BTS, i.e., overhead output parameter, output parameter obtained for a busy hour, an average forward power gain parameter, and a digital gain parameter; and
   d6-2) in the case of reverse link, analyzing a variety of parameters of the BTS, i.e., thermal noise approximate power parameter, a reception power for a busy hour, a cell loading parameter, and a frequency reuse efficiency parameter.

* * * * *